United States Patent
Luster et al.

(10) Patent No.: US 9,482,491 B1
(45) Date of Patent: Nov. 1, 2016

(54) DETACHABLE ARMOR HOLD DOWN

(71) Applicant: ArmorWorks Enterprises LLC, Chandler, AZ (US)

(72) Inventors: Matthew Luster, Mesa, AZ (US); Richard F. Langner, Scottsdale, AZ (US); Rockne H. Carter, Phoenix, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 145 days.

(21) Appl. No.: 14/291,702

(22) Filed: May 30, 2014

Related U.S. Application Data

(60) Provisional application No. 61/829,860, filed on May 31, 2013.

(51) Int. Cl.
 *F41H 5/013* (2006.01)
 *F16B 5/06* (2006.01)

(52) U.S. Cl.
 CPC ............. *F41H 5/013* (2013.01); *F16B 5/0642* (2013.01)

(58) Field of Classification Search
 CPC ...... F41H 5/013; F16B 21/02; F16B 5/0642; B64G 1/56
 USPC ..................... 89/937, 36.01, 37.01; 160/351; 109/49.5; 411/553, 552, 549
 See application file for complete search history.

(56) References Cited

U.S. PATENT DOCUMENTS

| | | | |
|---|---|---|---|
| 3,449,004 A | 6/1969 | Anderson | |
| 4,792,475 A | 12/1988 | Bien | |
| 5,191,166 A * | 3/1993 | Smirlock | F41H 5/013 109/49.5 |
| 5,267,820 A | 12/1993 | Sturtevant | |
| 5,795,974 A * | 8/1998 | Cole | C07K 14/30 435/5 |
| 6,065,917 A | 5/2000 | Shambeau et al. | |
| 6,082,240 A | 7/2000 | Middione et al. | |
| 6,530,730 B2 | 3/2003 | Swensen | |
| 6,712,544 B2 | 3/2004 | Kruger et al. | |
| 6,986,494 B2 | 1/2006 | Strasser | |
| 7,537,409 B2 * | 5/2009 | Huhnerbein | F16B 12/2009 403/348 |
| 7,628,104 B2 | 12/2009 | Warren | |
| 7,685,921 B2 | 3/2010 | Dagher | |
| 7,686,379 B2 | 3/2010 | Lemieux | |
| 7,695,053 B1 | 4/2010 | Boczek | |
| 8,016,339 B2 | 9/2011 | Hamaguchi et al. | |
| 2005/0260034 A1 | 11/2005 | Arbona | |
| 2009/0133571 A1 | 5/2009 | Pfister | |
| 2010/0077913 A1 | 4/2010 | Cunningham | |
| 2010/0083819 A1 | 4/2010 | Mann | |

* cited by examiner

*Primary Examiner* — Jack W Lavinder
(74) *Attorney, Agent, or Firm* — James L Farmer

(57) ABSTRACT

Methods and apparatus are provided for an armor mounting device capable of securely and detachably holding an armor panel to a floor. In one exemplary embodiment the armor mounting device consists of a base having a flat plate portion and a raised central portion, and a detachable clamp that includes a hold down plate and a spring loaded latch disposed within hold down plate. The spring loaded latch is connectable to the raised central portion of the base through a hole in the armor panel when the detachable clamp is juxtaposed with the base, to thereby trap the armor panel between the hold down plate and the flat plate portion of the base. A bonding agent secures the base to the floor.

10 Claims, 5 Drawing Sheets

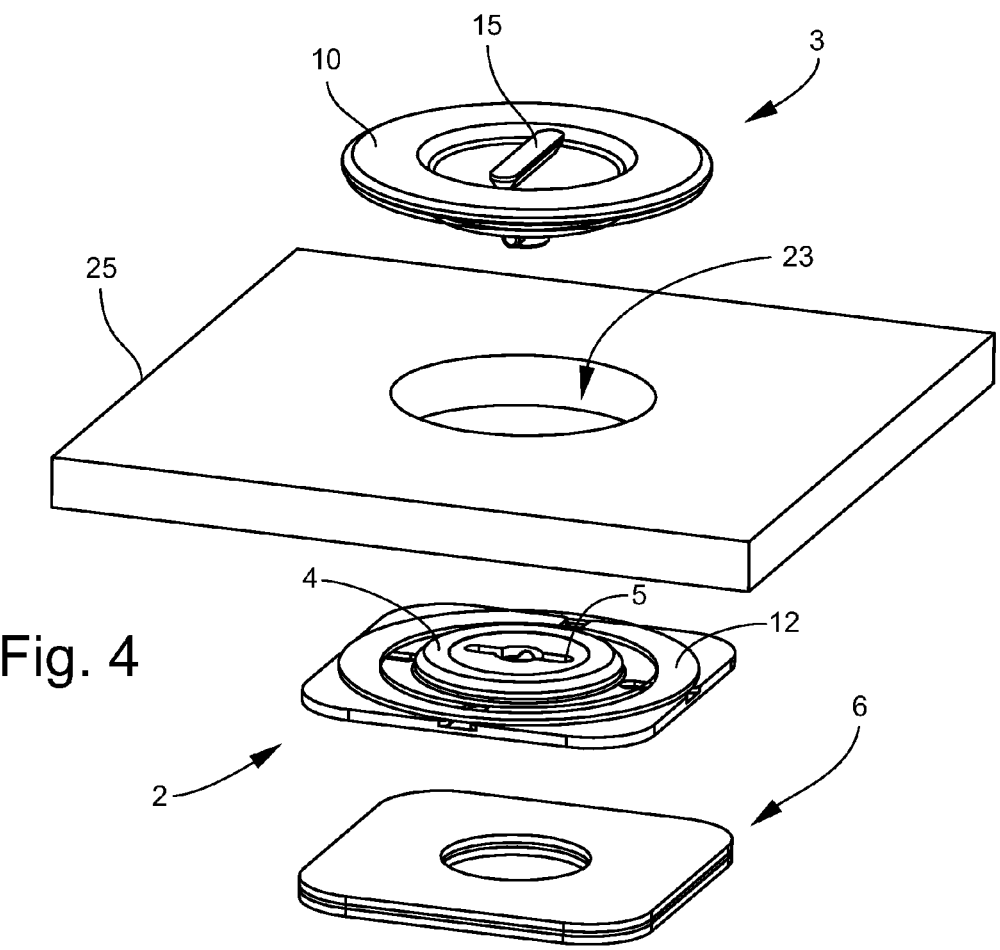
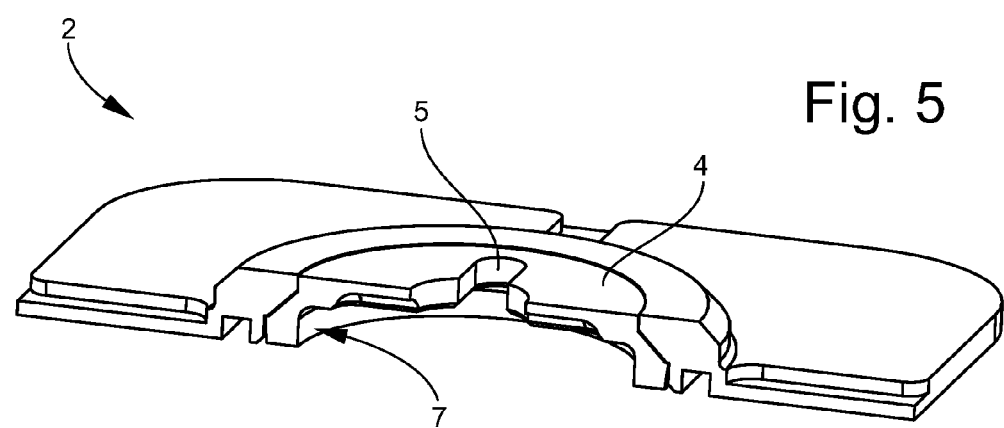

DETACHABLE ARMOR HOLD DOWN

Provisional Patent Application Ser. No. 61/829,860, to which the present application claims priority, is hereby incorporated by reference.

TECHNICAL FIELD

The technical field of the present invention relates to anti-ballistic armor panels. The technical field may further relate to installation of ballistic armor panels on interior surfaces of vehicles and other mobile or stationary structures.

BRIEF DESCRIPTION OF THE DRAWINGS

In the accompanying drawings:

FIG. 4 is an exploded view of the detachable armor hold down of FIG. 1 together with a portion of an armor panel and a detachable bonding agent;

FIG. 5 is a cut-away perspective view of an exemplary base portion of an armor hold down;

DESCRIPTION OF THE EMBODIMENTS

Figure 1:
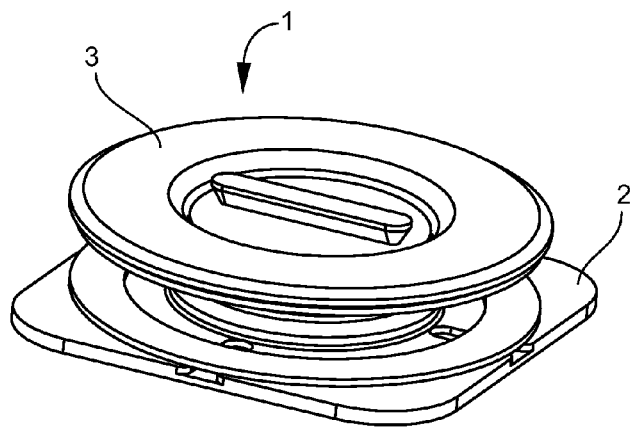
FIGS. 1 and 2 are perspective views of an exemplary detachable armor hold down in accordance with the present disclosure.
Figure 2:
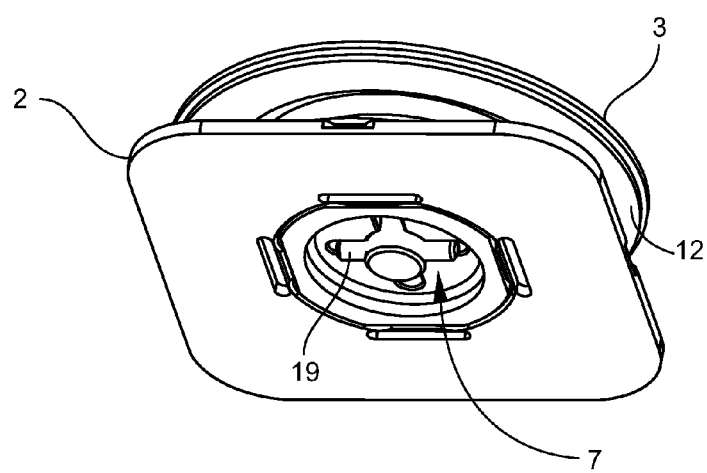
Figure 3:
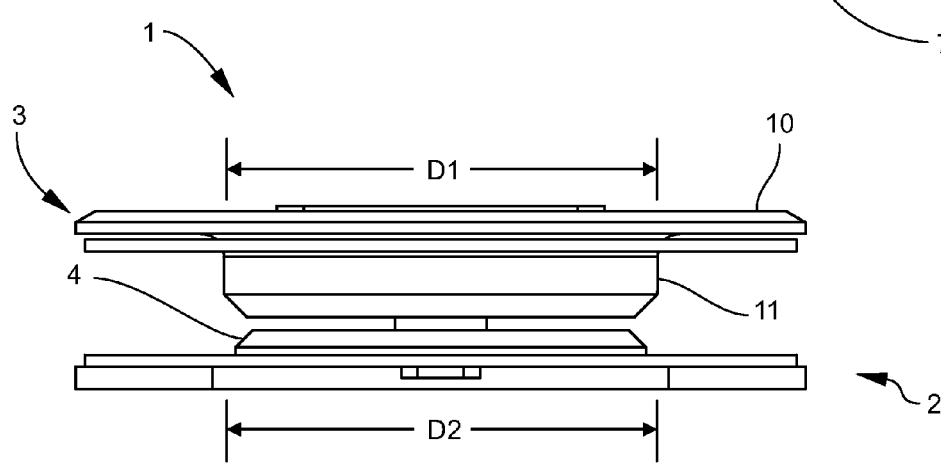
FIG. 3 is a side elevation of the armor hold down of FIG. 1.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring initially to drawing FIGS. 1 through 5, a detachable armor hold down in accordance with the present disclosure is indicated generally at reference numeral 1, and comprises a base 2 and a twist lock clamp 3. The base 2 comprises essentially a flat plate made of a high strength material such as aluminum or steel. A circular center portion of the plate is offset, or raised, defining a flat latch plate 4 with a keyhole slot 5. The latch plate 4 may be an integral portion of base 2 and made of the same material, or a separate piece as indicated in the drawings. For example, in one embodiment the base 2 is made of aluminum, and the latch plate 4 is a separate piece made of steel.

The base 2 may be detachably mounted to the floor of a vehicle or aircraft with any type of semi-permanent or permanent bonding agent, such as for example double sided tape or various adhesives. In one embodiment the base is affixed to the vehicle floor using self adhering patches of a releasable fastener material 6 (see particularly FIG. 4) such as hook and loop material, with one patch 6 adhered to the floor and a second mating patch 6 adhered to the underside of base 2. One such particularly suitable two-piece fastener material is manufactured by 3M and sold under the trade name "Dual Lock" reclosable fastener. With the base mounted to a surface in this manner, the latch plate 4 is elevated above the surface, defining a cavity 7 accessible through a keyhole slot 5.

Figure 6:
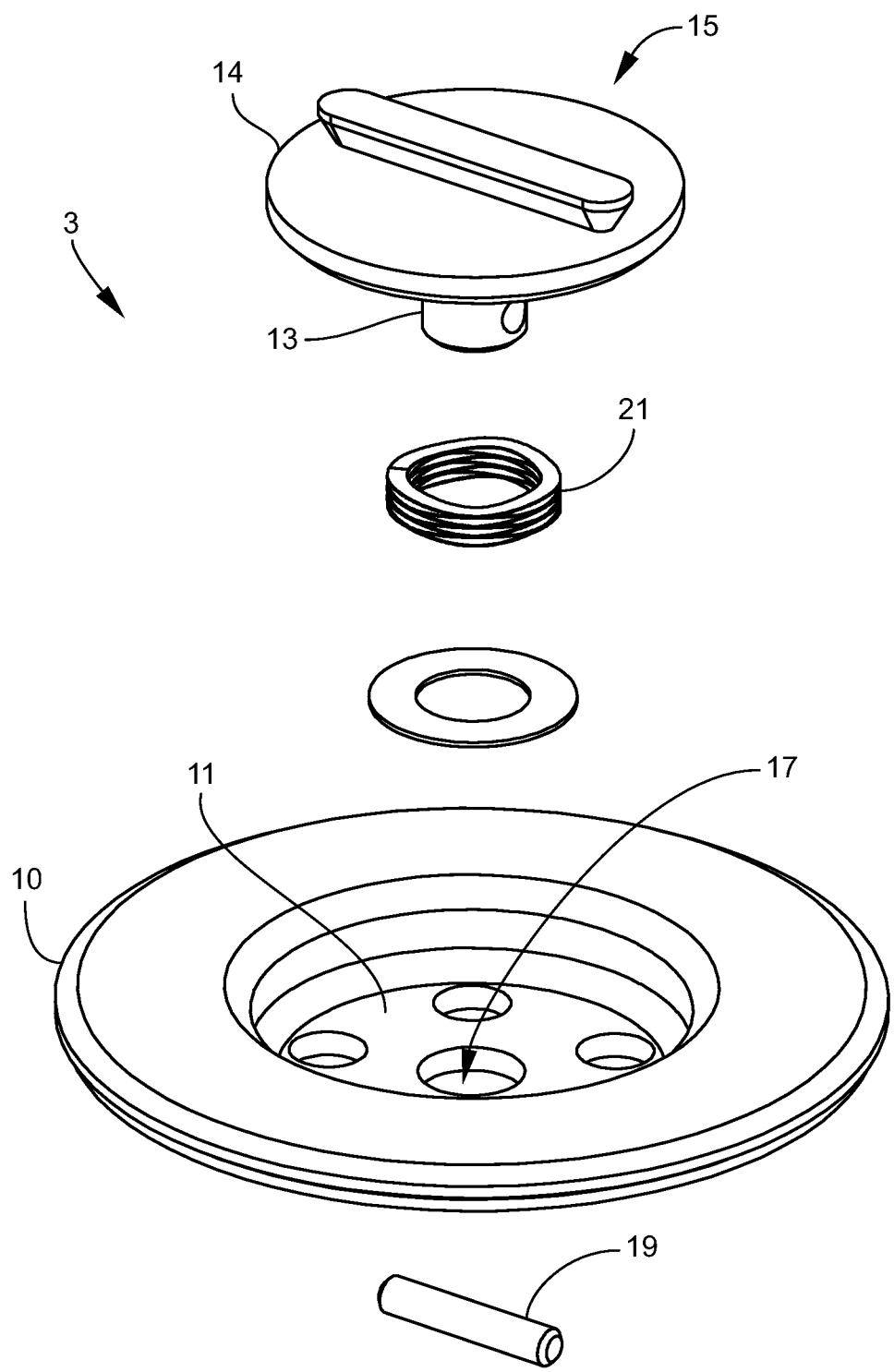
FIG. 6 is an exploded view of the twist lock clamp portion of the detachable armor hold down.
Figure 7:
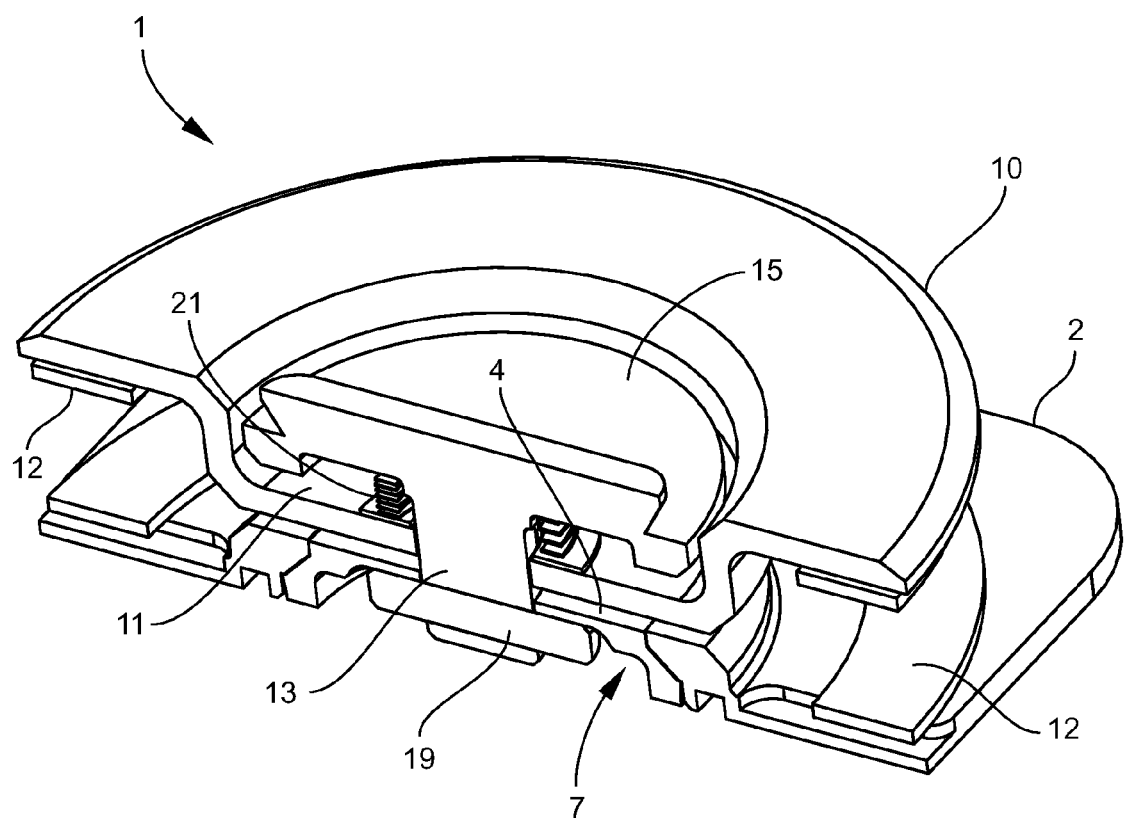
FIG. 7 is a cut-away perspective view of the assembled armor hold down also shown in FIGS. 1 through 3.

Referring now also to FIGS. 6 and 7, the twist lock clamp 3 comprises a hold down plate 10 with a circular recess 11 at the center. Recess 11 is substantially flat bottomed, with an external diameter D1 that is approximately equal to or slightly greater than an external diameter D2 of latch plate 4 (see FIG. 3). Disposed inside recess 11 is a knob 15 comprising a head portion 14, and a shaft portion 13 extending down from the head portion through a hole 17 at the center of recess 11. A detent pin 19 in the end of shaft portion 13 prevents the shaft from pulling back through hole 17, thus retaining knob 15 in recess 11. When assembled, a compression spring 21 disposed about shaft portion 13 biases the head portion 14 of knob 15 away from the top surface of recess 11, and pulls the detent pin 19 up against the underside of latch plate 4. A gasket 12 made of an elastomeric material such as neoprene may be applied to the underside of hold down plate 10.

To install an armor panel atop a vehicle floor using the detachable armor hold down, a series of holes 23 are cut in an armor panel 25 (see FIG. 4) at the desired attachment points. The diameter of the holes should be large enough to receive both latch plate 4 and recess 11, accounting for tolerances and potential misalignment. A corresponding number of bases 2 are positioned so as to align with each hole 23 in the armor panel, and bonded to the vehicle floor. Bonding may be accomplished using any of the above described adhesives or fastening systems. The panel is placed down onto the bases 2, such that the latch plates 4 project up into holes 23, and the portion of the armor panel immediately surrounding the holes 23 sits atop the flat portion of bases 2. One or more elastomeric gaskets 12 may also be disposed between the base and the armor panel to reduce contact stresses there-between. Additional spacers or cushions may be arrayed about the vehicle floor, or pre-applied to the bottom of the armor panel, to support the armor panel in the regions between mount points. Such spacers should approximate the thickness of base 2 plus a gasket 12.

With the armor panel correctly oriented and seated on each base 2, the twist lock clamps are installed. In particular, the clamp is placed over the hole 23, and rotated until detent pin 19 aligns with the keyhole slot 5 in latch plate 4. By then pushing down on knob 15 with enough force to compress spring 21, the end of shaft portion 13 and detent pin 19 are pushed through keyhole slot 5 and into cavity 7 (as best seen in FIG. 7). Once the detent pin 19 clears the bottom surface of latch plate 4, knob 15 is twisted so as to bring pin 19 out of alignment with slot 5, and then released. The force of spring 21 pushing up on the head portion of knob 15 now pulls pin 19 up against the bottom of latch plate 4, while simultaneously pushing hold down plate 10 down against the top of the armor panel. The armor panel is thus trapped and clamped between the hold down plate 10 and the base 2. The thickness or number of gaskets 12 may be adjusted as needed to maintain a gap between the bottom surface of recess 11 and the top surface of latch plate 4, and thereby ensure that the hold down plate 10 bears down against the armor panel. Then by twisting the knobs 15 again until the pins 19 align with the keyhole slots, the twist clamps can be removed, and the armor panel lifted off of bases 2 and removed from the vehicle floor.

It should be appreciated that the armor panel installation steps described above may be performed in various ways besides the recited sequence. For example, in one exemplary installation process, a base 2 and a twist lock clamp 3 are installed and connected together at each mount hole 23 of an armor panel. A bonding agent is applied to the bottom of each base 2. In the case of a two-piece re-closable fastener system, a pair of patches secured to each other is adhered to the bottom of each base 2, and the adhesive is unclamped on the bottom surface of the bottom patch. The armor panel with the installed hold-downs is then lowered into place, thereby bringing the exposed bonding agent under each base into contact with the floor. Additional weight can be applied as needed, such as by walking on the panel, to further secure the adhesive. Alternatively, the panel can be temporarily removed so that each base 2 can be individually pressed down to positively create a secure bond, and the panel re-installed.

Figure 8:
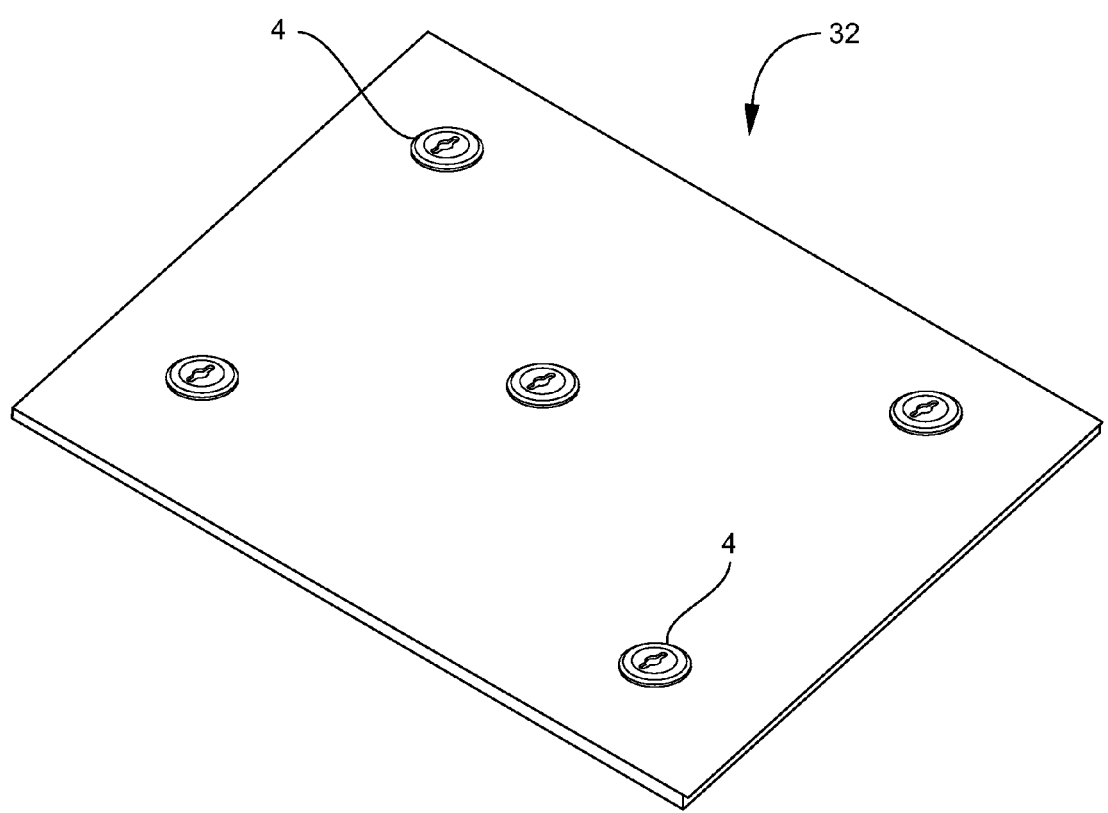
FIG. 8 is a perspective view of a base consisting of a single large plate with multiple armor attachment points.

In addition, rather than having a separate assembly with a separate base 2 at each hold down location of an armor panel, the base portion could instead be configured as one large plate with multiple attachment points. For example, referring to FIG. 8, a base 32 made of a sheet material such as aluminum has an array of raised latch plates 4 that may be molded into or welded on the base sheet material. The latch plates 4 are positioned to align with corresponding holes in an armor panel, and operate to receive and capture a twist lock clamp at each hold down location in the manner described above. In this embodiment the base 32 may be attached to the vehicle floor with a single large sheet of the fastening material, instead of with a separate patch at each hold down location as in the previously described embodiment.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to clamp the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An armor mounting device for securely and detachably holding an armor panel to a vehicle floor, comprising:
   a base comprising a flat plate portion with top and bottom surfaces, and a raised central portion defining a cavity underneath, the raised central portion configured to project upward into a hole in an armor panel when a bottom surface portion of the armor panel is resting on the top surface of the flat plate portion of the base;
   a detachable clamp comprising a hold down plate and a spring loaded latch disposed within the hold down plate, the spring loaded latch connectable to the raised central portion of the base through the hole in the armor panel when the detachable clamp is juxtaposed with the base, to thereby trap the armor panel between a bottom surface of the hold down plate and the top surface of the flat plate portion of the base; and
   a bonding agent on the bottom surface of the flat plate portion of the base for securing the base plate to the vehicle floor.

2. The armor mounting device of claim 1, wherein the bonding agent comprises a first layer attached to the bottom surface of the base, and a second layer attached to the vehicle floor.

3. The armor mounting device of claim 2, wherein the first and second layers are patches of hook and loop fastener material.

4. The armor mounting device of claim 1, wherein the spring loaded latch is configured to bias the hold down plate toward the base with sufficient force to securely clamp the armor panel against the flat plate portion of the base.

5. The armor mounting device of claim 4, wherein the spring loaded latch comprises:
- a knob with a head portion and a shaft portion, the shaft portion extending down from the head portion to a free end;
- a compression spring disposed about the shaft portion between the head portion of the knob and the hold down plate; and
- a detent at the free end of the shaft portion, wherein the shaft portion is long enough such that when the head portion of the knob is pressed downward and the compression spring is compressed, the free end of the shaft and detent extend down through an aperture in the raised central portion of the base, and into the cavity underneath the raised central portion.

6. The armor mounting device of claim 5, wherein the detent is a pin oriented perpendicular to the shaft portion and projecting outward from both sides thereof, and wherein the aperture in the raised central portion of the base is a keyhole slot with a circular portion for receiving the shaft portion and slot portions for receiving the pin.

7. The armor mounting device of claim 6, wherein the clamp may be locked to the base by pushing down on the knob until the pin clears a bottom surface of the raised central portion of the base, and then twisting the knob until the pin is not aligned with the keyhole slot.

8. The armor mounting device of claim 1, wherein the hold down plate has a central recess configured to project downward into a hole in an armor panel when the hold down plate is bearing against a top surface portion of the armor plate, the central recess having a bottom surface configured to be juxtaposed and spaced apart from a top surface of the raised central portion of the base when the raised central portion of the base is projecting upward into the hole in the armor plate and a bottom surface portion of the armor panel is resting on the top surface of the flat plate portion of the base.

9. The armor mounting device of claim 8, further comprising an elastomeric gasket on the top surface of the flat plate portion of the base.

10. The armor mounting device of claim 1, further comprising a second raised central portion defining a second cavity underneath, the second raised central portion configured to project upward into a second hole in an armor panel when a bottom surface portion of the armor panel is resting on the top surface of the flat plate portion of the base.

* * * * *